Patented Oct. 27, 1953

2,657,179

UNITED STATES PATENT OFFICE 2,657,179

TREATMENT OF INDUSTRIAL WATERS

William W. Robinson, Jr., Hollywood, Calif., assignor to Texaco Development Corporation, New York, N. Y., a corporation of Delaware No Drawing. Application September 24, 1948, Serial No. 51,125

5 Claims. (Cl. 210—23)

This invention relates to the treating of industrial waters such as are used in swimming pools, and circulated through heat exchangers, cooling ponds, towers, and like apparatus.

Industrial waters that have been passed through heat exchangers and like devices for absorbing the heats of chemical reactions, sensible heats, latent heats and the like such as those occuring in the practice of distillation, cracking, fractionation, etc., are usually cooled and recycled for re-use. Cooling is most efficiently accomplished in the well-known cooling tower wherein the water flows downwardly over a series of baffles and is subjected to contact with the atmosphere or in spray devices wherein the water is sprayed into the air and collected in a surrounding pond.

A material problem in the operation of such towers and other cooling devices is the growth of algae and similar organisms. Algae are very small and simple forms of plant life which usually combine in large masses, generally as stringy weed-like formations. Such formations attach themselves to any solid object with which the algae-containing water comes into contact. Other types of algae float and form the scum often seen on still water. Under favorable conditions of light and temperature, algae develop a very disagreeable odor.

Such algae constitute a major problem in the handling of industrial waters in that they tend to coat any surfaces they contact and tend to block pipes and passages. Mechanical cleaning is not always feasible because of the many small and relatively inaccessible passages involved as in a heat exchanger, and the necessity for shutting down the equipment for the cleaning process. Other proposals such as keeping light away from the water, creating high velocity, turbulent flows, the periodic circulation of relatively hot water, and the use of electric currents have been generally unsuccessful. Chemical treatment has been proposed but thus far has not been entirely satisfactory because of the corrosive effect of the chemicals on the metal apparatus, toxicity, and danger in handling.

Like problems have been encountered in the treatment of swimming pool waters, etc.

It is an object of this invention to provide a novel process wherein the growth of such algae and like organic matter is inhibited to an extent to eliminate the aforesaid disadvantages, the process being free of the disadvantage attendant upon prior processes.

Another object of the invention is to provide a novel type of cooling medium or industrial water wherein the growth of algae and the deposition of scale on the involved apparatus is inhibited.

Still another object of the invention is to provide a novel algicide.

Further objects and advantages of the invention will appear from the following description and claims.

In its broader aspects, the invention involves the treating of such industrial waters and kindred cooling mediums with a compound or compounds capable of inhibiting the growth of algae and like organisms. More specifically, the invention involves the use of heavy metal polyphosphates or the reaction products of compounds going to produce such polyphosphates i. e., the reaction products of an alkali metal polyphosphate and a heavy metal salt when caused to react in stoichiometric proportions to produce heavy metal polyphosphates. Such heavy metal polyphosphates may be regarded as complex heavy metal polyphosphates in that the heavy metal is not always all available in simple ionic form and may be considered as sequestered to a greater or less degree. Such treatment is applicable to water in general such as is found in swimming pools, ponds, etc. where the algae problem may be present.

The aforesaid reaction products, which are believed to be neutral metal polyphosphates, but may also include acid or so-called basic metal polyphosphates, may be prepared by reacting approximately the proper stoichiometric proportions of the polyphosphate selected from the left column of the following table and a heavy metal compound selected from the right column.

| Polyphosphate | Heavy Metal Compounds |
|---|---|
| Sodium tetraphosphate $Na_6P_4O_{13}$ | $CuSO_4$ |
| Sodium triphosphate $Na_5P_3O_{10}$ | $AgNO_3$ |
| Sodium hexametaphosphate $Na_6P_6O_{18}$ | $HgCl_2$ |
| Sodium pyrophosphate $Na_4P_2O_7$ | $CdSO_4$ |
| Disodium dihydrogen pyrophosphate $Na_2H_2P_2O_7$ | $MnSO_4$ |
| Pyrophosphoric acid $H_4P_2O_7$ | $NiCl_2$ |
| | $ZnSO_4$ |
| Polymetaphosphoric acids $(HPO_3)_5$ | $CuCO_3Cu(OH)_2$ malachite |

While the sodium salts have been listed, it is to be understood that the salts of alkali metals in general, including potassium, lithium, and ammonium salts which are sufficiently stable and the mixed salts thereof may be used. The term alkali metal as used herein is intended to include the ammonium radical in such compounds. Likewise the various metals listed in the right column may be used with anions other than those listed, providing that no seriously detrimental or harmful reaction products are formed. The listed compounds are cited only as examples of some of the possible reactants. It will be noted that the metals listed above are heavy metals as defined in Hackh's Chemical Dictionary, third edition.

The following are listed as examples of the reactions that are believed to take place, the character M representing the heavy metal in a bivalent form. It is to be understood that the equations can also be written for such metals of other valances.

(1) $Na_6P_6O_{18} + 3MSO_4 \rightarrow M_3P_6O_{18} + 3Na_2SO_4$
(2) $Na_4P_2O_7 + 2MSO_4 \rightarrow M_2P_2O_7 + 2Na_2SO_4$
(3) $Na_2H_2P_2O_7 + MSO_4 \rightarrow MH_2P_2O_7 + Na_2SO_4$
(4) $Na_6P_4O_{13} + 3MCl_2 \rightarrow M_3P_4O_{13} + 6NaCl$
(5) $2Na_5P_3O_{10} 5MCl_2 \rightarrow M_5(P_3O_{10})_2 + 10NaCl$ In Equation 1 when copper, nickel and mercury salts are used, such as copper sulfate, nickel chloride and mercuric chloride, clear solutions were obtained. As examples of these reactions, stoichiometric quantities of the following reactants were caused to react to form a theoretical 10 grams of the heavy metal polyphosphates.

(6) 10 g. $Cu_3P_6O_{18}$ from 9.22 g. $Na_6P_6O_{18}$ and 11.27 g. $CuSO_4.5H_2O$
(7) 10 g. $Ni\ P_6O_{18}$ from 9.43 g. $Na_6P_6O_{18}$ and 10.97 g. $NiCl_2.6H_2O$
(8) 10 g. $Hg_3P_6O_{18}$ from 5.70 g. $Na_6P_6O_{18}$ and 7.57 g. $HgCl_2$
(9) 10 g. $Cu\ H_4P_6O_{18}$ from 8.86 g. $HPO_3$ and 1.80 g. $Cu(OH)_2$ In each case the polyphosphate was dissolved or suspended in 80 to 90 ml. distilled water, the metal salt added, and the mixture shaken until the reaction appeared to be complete. The solution was then brought up to 100 ml. by the addition of distilled water, all chemical addition thereafter being based on the premise that 100 ml. of the solution contained 10 grams of the heavy metal polyphosphate.

That a complex heavy metal polyphosphate is formed in each instance is indicated by the fact that the apparent reaction products have entirely different and more beneficial effects than the original reactants when used alone.

The amount of reaction product or agent used in a particular water or other coolant will depend on a number of different factors such as the degree of contamination by the algae, the rate of circulation of the liquid, the character of the apparatus through which the liquid is circulated, the character of the liquid, the temperature extreme to which it is subjected, and the material from which the cooling pond walls may be formed. In the case of old liquids, a high initial charge followed by reduced charges at intervals may be desirable. With fresh liquids, the heavy initial charge may be omitted. For algae control in general, sufficient of the complex to produce a residual concentration of the heavy metal of about 2.5 to 10 parts per million, preferably about 5 parts per million, is believed satisfactory. The mercury and silver compounds are considered to possess a more sustained killing effect and to be effective in lower concentrations.

Since different species of algae may be encountered, some of which are more affected by some complexes than others, it may be desirable in some cases to charge the water with a mixture of different complexes in accordance with the character of the algae content. In all cases, it is desirable that the character and amount of the complex or complexes be so selected that corrosion of the associated apparatus is held to a minimum.

While the term "reaction products" as used herein is intended primarily to include the apparently complex reaction products, it is also intended to include any other of the reaction products that may contribute to the improved results obtained.

It is to be understood that the "reaction products" may be prepared and charged to the water or the reactants may be charged to the water and the reaction products formed therein, providing no undesirable by-products are formed such as might be formed with components already present in the water.

Obviously many modifications and variations of the invention as above set forth may be made without departing from the spirit and scope thereof, and therefore only such limitations should be imposed as are indicated in the appended claims.

I claim:

1. A process for inhibiting the growth of algae and the like in industrial waters such as are circulated through cooling ponds, heat exchangers and the like which comprises the steps of reacting in an aqueous medium an alkali metal phosphate with a compound containing a heavy metal selected from the group consisting of copper, mercury, nickel, silver, zinc, manganese and cadmium, said reactants being used in approximately stoichiometric proportions to form a heavy metal polyphosphate and charging the resulting reaction products to said water in an amount to provide a residual concentration of heavy metal of about 2.5 to 10 parts per million.

2. A process according to claim 1 in which said reaction products are charged in an amount to provide a residual concentration of heavy metal of about 5 parts per million.

3. A process for inhibiting the growth of algae and the like in industrial waters such as are circulated through cooling ponds, heat exchangers and the like which comprises the steps of reacting in an aqueous medium in alkali metal pyrophosphate with a compound containing a heavy metal selected from the group consisting of copper, mercury, nickel, silver, zinc, manganese and cadmium, said reactants being used in approximately stoichiometric proportions to form a heavy metal pyrophosphate and charging the resulting reaction products to said water in an amount to provide a residual concentration of heavy metal of about 2.5 to 10 parts per million.

4. A process according to claim 3 in which a reaction product containing copper pyrophosphate is employed in an amount to provide a residual concentration of copper of about 5 parts per million.

5. A process according to claim 3 in which a reaction product containing mercury pyrophosphate is employed in an amount to provide a residual concentration of mercury of about 5 parts per million.

WILLIAM W. ROBINSON, Jr.

References Cited in the file of this patent

UNITED STATES PATENTS

| Number | Name | Date |
|---|---|---|
| 2,209,129 | Mengele et al. | July 23, 1940 |
| 2,237,045 | Booth | Apr. 1, 1941 |
| 2,337,856 | Rice et al. | Dec. 28, 1943 |
| 2,400,677 | Allen | May 21, 1946 |
| 2,400,863 | Gelfand | May 21, 1946 |

FOREIGN PATENTS

| Number | Country | Date |
|---|---|---|
| 13,199 | Great Britain | of 1894 |

OTHER REFERENCES

Journal Chemical Society, 1936, pages 1412–29.